Figure 1:
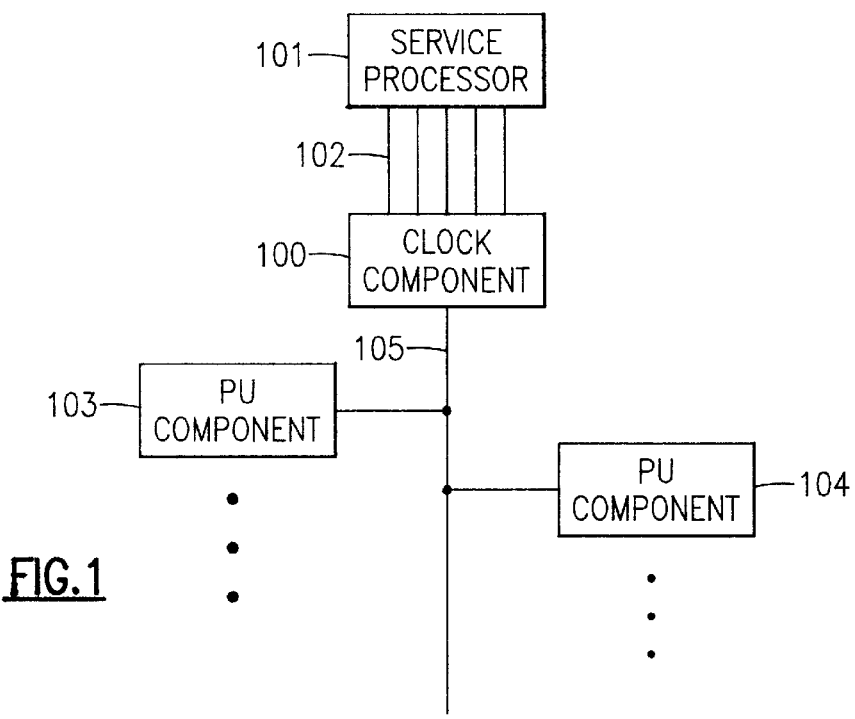

United States Patent

Braun et al.

[11] Patent Number: 5,964,845
[45] Date of Patent: Oct. 12, 1999

[54] PROCESSING SYSTEM HAVING IMPROVED BI-DIRECTIONAL SERIAL CLOCK COMMUNICATION CIRCUITRY

[75] Inventors: Robert Braun, Ebhausen; Wilhelm Haller, Rehmshalden; Klaus Jörg Getzlaff, Schönaich; Thomas Pflüger, Leinfelden; Dietmar Schmunkamp, Ehningen, all of Germany

[73] Assignee: International Business Machines Corporation, Armonk, N.Y.

[21] Appl. No.: 08/765,418

[22] PCT Filed: Apr. 18, 1995

[86] PCT No.: PCT/EP95/01451

§ 371 Date: Dec. 16, 1996

§ 102(e) Date: Dec. 16, 1996

[87] PCT Pub. No.: WO96/33464

PCT Pub. Date: Oct. 24, 1996

[51] Int. Cl.⁶ ................................ G06F 11/00
[52] U.S. Cl. .................. 709/400; 710/110; 713/400; 713/500; 713/600
[58] Field of Search .................. 395/551–556, 395/559–560, 185.01, 185.05, 185.06, 182.04; 709/400, 208–209; 710/110; 713/400, 500–501, 600; 714/48, 51

[56] References Cited

U.S. PATENT DOCUMENTS

| | | | |
|---|---|---|---|
| 4,064,486 | 12/1977 | Faber | 340/825.05 |
| 4,329,030 | 5/1982 | Aihara et al. | 396/251 |
| 4,901,275 | 2/1990 | Hardie et al. | 710/1 |
| 4,918,652 | 4/1990 | Bennington et al. | 395/559 |
| 5,065,042 | 11/1991 | Thomsen et al. | 327/160 |
| 5,247,657 | 9/1993 | Myers | 395/200.66 |
| 5,341,480 | 8/1994 | Wasserman et al. | 76/107 |
| 5,416,918 | 5/1995 | Gleason et al. | 395/559 |
| 5,459,462 | 10/1995 | Venkidu et al. | 341/22 |
| 5,535,405 | 7/1996 | Byers et al. | 710/110 |
| 5,638,542 | 6/1997 | Nikjou | 395/750.05 |
| 5,732,036 | 3/1998 | Merritt et al. | 365/203 |
| 5,878,234 | 3/1999 | Dutkiewicz et al. | 710/110 |

*Primary Examiner*—Zarni Maung
*Assistant Examiner*—Bharat Barot
*Attorney, Agent, or Firm*—Lynn L. Augspurger; William B. Porter; Cantor Colburn LLP

[57] ABSTRACT

One or more processing units are connected with a clock component (comprising a clock) over a bi-directional serial link, and data frames are transmitted between the clock component and the processing units. The clock component may contain a serial link combination circuit for combining multiple processing unit serial links, operating in parallel, into a single serial link connected to the clock. Both of the clock component and the processing units contain an error detection and correction mechanism which examine and modify data within the data frames to perform error detection and correction. The clock component optionally contains an external interface for connection to a command-issuing Service Processor.

11 Claims, 3 Drawing Sheets

PROCESSING SYSTEM HAVING IMPROVED BI-DIRECTIONAL SERIAL CLOCK COMMUNICATION CIRCUITRY

1 BACKGROUND OF THE INVENTION

1.1 Field of the Invention

Within a processor system consisting of a multitude of functional components encompassing at least one processing unit (PU), also called a CPU, and a clock component the present invention relates to a communication circuitry for connection and data exchange between the clock component and the PU components.

1.2 Description and Disadvantages of Prior Art

A processor system typically consists of various functional components. Depending on the type of requirements and limitations these functional components may be integrated within a single chip or may be dispersed over several separate chips. Due to silicon real estate constraints, many micro-processors do not consist of a single chip, but a chip set. Major components, as a rule, are the basic CPU component, the memory management unit component, a floating point coprocessor component, and a bus adapter component. Mainframe architectures often also includes a separate clock component, a specialized high speed control store component, a memory controller component and a specific service processor component (SP).

The machine cycle is the basic unit of timing in a computer. Within a machine cycle atomic operations, e.g. performing an addition, take place. Instructions are executed within one or several machine cycles. The machine cycle is controlled by an external timing source, an oscillator (usually a crystal) with a constant frequency. Clock logic uses this input to generate various timing signals to control the processor logic at desired timing points within the machine cycle. Existing microprocessor designs implement the clock logic function in one of two different ways:

Either the clock functions are integrated into the individual PU (or CPU component), floating point processor component etc.

Or a separate clock component generates the clock signals for all other components A typical example of the second approach are IBM/390 processors implementing the IBM/390 mainframe architecture described in the "System/390 Principles of Operation". As those portions of the system that run synchronously may span several chips, the design of the clocking system deserves special attention. If clock signals are distributed over several chips the individual chips may be drastically different with regard to process tolerances. Thus the same clock signal may arrive at the receiving logic spread out in time, referred to as clock skew. A centralized clock component, together with a carefully designed topology for clock signal wiring, significantly reduces clock skew. In addition to the clock generation the clock component performs run control operations, i.e. functions like Start—Stop control, Power on reset recognition, Reset sequence generation for other components, clock checking, and Console key controls.

The clock component generates centrally all the clock signals required by the other components in the system. It requires an external hybrid oscillator and optionally an active delay line. It offers a multitude of different clock signals. The timing of each clock is independently programmable in terms of pulse width, phase, and cycle time, and thus can be adapted to the varying system requirements. The clock signals feed directly the receiving components without any further gating. All clock lines are point to point nets, and clock skews are to be minimized. Clock signals are checked within the clock component.

On power-on recognition the clock component is initialized and clock signal generation starts. The clock signals to be delivered at certain reset and start up points are controlled by the run control.

The clock component is the master of the component set for the reset function, which typically include "Power on Reset", "Reset for IML", "System Reset", "Check Reset", "Start after Reset" and so forth.

The clock component typically provides further external hardware interfaces, implemented in IBM/390 systems as a five-line support bus of two bit lines (in/out) and three control lines, to cause the clock component to execute functions mentioned above. For instance an auxiliary processor, the so-called service processor (SP), may exploit this external interface of the clock component for an overall control of the processor.

Current state of the art technology, as realized for example within the current IBM/390 systems, uses multiple signal pins and corresponding signal lines between the clock component and the PU components. Within a /390 system there are 5 signal lines connecting the clock and a PU component associated with the following meaning:
1. Micro Instruction Step
2. Micro Instruction Address Compare
3. Soft Stopped Sate
4. Wait State
5. Malfunction Alert The drawbacks of the above approach of connecting and communicating become evident and striking once an attempt is made to build a system with not only a single PU component. The disadvantages with respect to the state of the art approach, which already are present also in the case of a single PU component, increase with the number of PU components and may result in the infeasibility of building a multi-processor system with a larger number of PUs.

Due to the large number of signal lines connecting the clock component and a multitude of PU components the state of the art approach hinders to realize multi-processor systems.

To demonstrate the urgent need to optimize the communication technology between the service processor (SP) and a PU in terms of the required number of signal pins one has to shed further light on the current state of the art approach. The current implementation within a /390 system shows 5 signal pins and signal lines connecting the clock and a PU component associated with the meanings mentioned above. Assume for the moment a typical multi-processor system of current stat of the art technology. It is assembled of 2 so-called Multi-Chip-Modules (MCM) each comprising 6 PU components. The signals 1 to 4 of above list are individual to each PU and thus contribute 24 signals to a MCM. The 5-th signal is a multidrop net that is received by each PU component. Due to driving limitations this 5-th signal does not account for 6 but for 12 signals per MCM. All in all this state of the art example shows that 36 signals are necessary for the communication between the clock and an MCM. The situation on the clock component is even worse; as it communicates to 2 MCMs all in all the immense number of 72 signals are required. Further extensions of the number of PUs are significantly hindered by the current clock-to-PU communication technology. Testing of these huge number of lines causes further sever problems.

The large number of signal lines between PU components and the clock component would have to be connected to the clock chip at the boundary of the 2-dimensional chip. Due to spatial requirements for the individual signal lines the size of a component to a large extend is determined by the number of input/output signals; the clock component would have to be increased significantly just to be able to direct the signal lines to the clock chip's boundary. This would result in a clock component much larger in size than required for the actual clock component circuitry. Thus as a consequence unused and therefore wasted chip size would be a further outcome, not to talk about the difficulties of arranging and distributing the huge number of signal lines between clock and PU components within the micro processor system.

A linear increasing of the number of signal pins on the clock component with the number of PU components in addition drastically impede the manufacturing process and at the same time increasing the requirements for the manufacturing process itself.

The state of the art approach offers no concept to validate whether the transmitted data has been correctly received by the PU component. Extended error detection and error correction with respect to information exchange between clock and a PU component is not supported, being a central issue in a multiple PU system as with increasing number of components the probability for error situations is increased.

Furthermore the large number of signal lines in a multiple PU system exploiting the state of the art approach would significantly jeopardize noise immunity on the clock lines without any chance and support to detect and localize the error.

1.3 Objective of the Invention

The invention, related to a processor system, is based on the objective to provide a new kind of clocking concept and circuitries for communication between the clock and the PU components within a multi-processor system. The invention should help to remove the obstacles in building processor systems with a larger number of PU components.

2 SUMMARY AND ADVANTAGES OF THE INVENTION

A processor system with various functional components among others a clock component and one or more PU components may integrate individual components within a single chip or may be embodied as separate chips integrated within a chip-set. The current invention proposes a processor system with communication circuitry means for communication between the clock component and the PU components. The invention achieves to reduce the communication circuitry means between said components up to a single serial signal link. This reduces the communication wiring tremendously up to a single signal line.

This drastic reduction of the number of signal lines is especially advantageous if more than one PU components are operated within the processor system. Processor systems with a very large number of PU components may become feasible due to the current invention.

Also the clock component itself will benefit from the reduced number of input/output signal lines. As the size of the clock component is determined to a large extend by the number of input/output signals the size of the clock component can be reduced by the invention and wasted chip size is avoided.

Further, a significant reduction of the signal lines between clock and PUs also eases the manufacturing process.

Further, a reduction of the large number of signal lines in a multiple PU system significantly improves noise immunity.

The invention introduces new cooperating communication circuitries means on the clock component and each PU component. The new communication circuitry means minimizes the number of signal lines for communication between the clock component and all PUs to a single wire communication link. The components communicate synchronously over the serial interface. Furthermore, the communication is bidirectional. Of course the communication link is operated as a framed serial interface transmitting information as blocks of data with a well-defined structure, called data frames.

According to a further embodiment of the proposed invention a serial link combination means has be introduced for combining multiple of that serial links between clock and PU components which are operated in parallel to form a single logical serial link. Any number of serial links starting with only a single serial link up to N parallel serial links may be combined to implement a single logical serial link where the number of said serial links may be chosen according to external circumstances. Neither the communication circuit means on the clock component nor that on the PU components are influenced by the peculiarities of how many of these serial links are operated in parallel or how many PU components are exploiting the same serial link.

These independence characteristics offer a huge range of design flexibility. The number of parallel signal lines and the number of PUs sharing a single signal line may be adapted according other external conditions. For instance, this flexibility may be used to minimize the clock skew problem. Or another target might be to improve the noise immunity. Also the flexibility may ease to overcome chip layouting hurdles or may help to easier achieve driving requirements.

According to a further embodiment of the proposed invention a bidirectional, synchronous communication link is provided which is operated by transmitting information as blocks of data with a well-defined structure, called data frames.

By introducing a bidirectional communication protocol between the clock and the PU components instead of the one-directional signal propagation approach taught by the state of the art it becomes possible the first time that the clock and PU establish a feedback loop informing one another on communication and signaling errors. Thus error detection is possible.

According to a further embodiment of the proposed invention the clock component, as the master for driving the communication, executes a specialized protocol. The clock component sends data frames with a well-defined structure repeatedly. The beginning of the transmission and the beginning of the data frame is identified by a data header guaranteed to be unique and not to occur within the data frame itself. All PU components receive and process the same said data frame concurrently and synchronously. Each of the PU components may respond to the data frame at certain time slots specific to and dedicated to each of the PU components during data frame transmission. Each PU response consists itself in sending a small data block of predefined length to the clock component. Communication protocol is extremely flexible. It allows for instance to adapt the length of the data frame to any number of PU components. Apart from the header the data frame encompasses a PU field to select and identify one or more of the PU components by a PU number where the PU number identifies exactly one PU components within the processor system. Further the data frame encompasses a command field selecting one or more commands of a set of possible commands for execution on one or more PU components. The command execution may also depend on the contents of the PU field. The data frame also encompasses a checksum field permitting a receiver to execute transmission error detection and error correction. Finally the data frame encompasses for each of said PU components within the processor system a unique PU response field to be filled by the associated PU component.

Modification with respect to the number of PUs or enhancements with respect to the spectrum of possible reactions of the PUs can easily be realized. Thus a very high degree of flexibility has been introduced to the architecture. A most important aspect of the invention is the ability to validate whether the transmitted data has been correctly received by a PU component. Extended error detection and error correction with respect to information exchange between clock and a PU component now become possible, in contrast to the state of the art teaching. Especially in a multiple PU system with increasing number of components and therefore increased probability for error situations it is a central issue to detect, localize and correct error situations. Malfunctions of a single component may not result in a failure of the overall system.

In a further embodiment of the proposed invention the uniqueness of the data header is achieved by a so-called return-to-zero encoding scheme of the data within the data frame consisting in sending after each data bit a binary zero ('0') thus avoiding a bit pattern of two or more consecutive binary ones ('1'). A bit pattern with consecuting binary ones may therefore serve as part of the data header.

According to a further embodiment of the proposed invention the command encoded in the command field is executed synchronously on all receiving PU components once the checksum field has been successfully validated by each PU component.

According to a further embodiment of the proposed invention the clock component is enhanced by an external interface with the corresponding wiring for issuing commands to be processed at least on one of the PU components and returning the processing results. This external interface may be used for instance by the SP. The clock component maps the requested command into said data frame, transfers said data frame for processing to the PU components and returns the response of the PU components across said external interface. In addition the said clock component is capable of buffering several commands and to serialize the buffered commands for execution according a predefined priority scheme.

According to a further embodiment of the proposed invention and to further protect the overall system against failures of sub-components the communication circuitry means include certain signal line clearance means. The signal line clearance means on the clock component send a binary zero on the serial link as the first bit of each of said PU response fields. That clearance approach guarantees a cleared serial link independent of any possible preceding error which might otherwise interfere with the next PU response.

According to a further embodiment of the proposed invention clock component is enabled to execute, if no specific command has been requested, a default command. This default command execution results in the determination of the active PUS within the system and all PUs will be informed on the current set of active PUs.

The default command processing enhancement makes sure that at any point in time the status of active PUs within the processor is well-known.

According to a further embodiment of the proposed invention the enhanced external interface of the clock component, which for example may be exploited by the SP, allows to set the PU field, the command field and the checksum field explicitly; i.e. these fields are not computed by the communication circuitry itself according to the requested command. This embodiment facilitates to generate intentionally consistency error s within said data frame to check the communication circuitry on the PU components for faultless behavior. Therefore the current invention even is able to support the checking of the checker logic within the new communication circuitry.

3 BRIEF DESCRIPTION OF THE DRAWINGS

Figure 2:
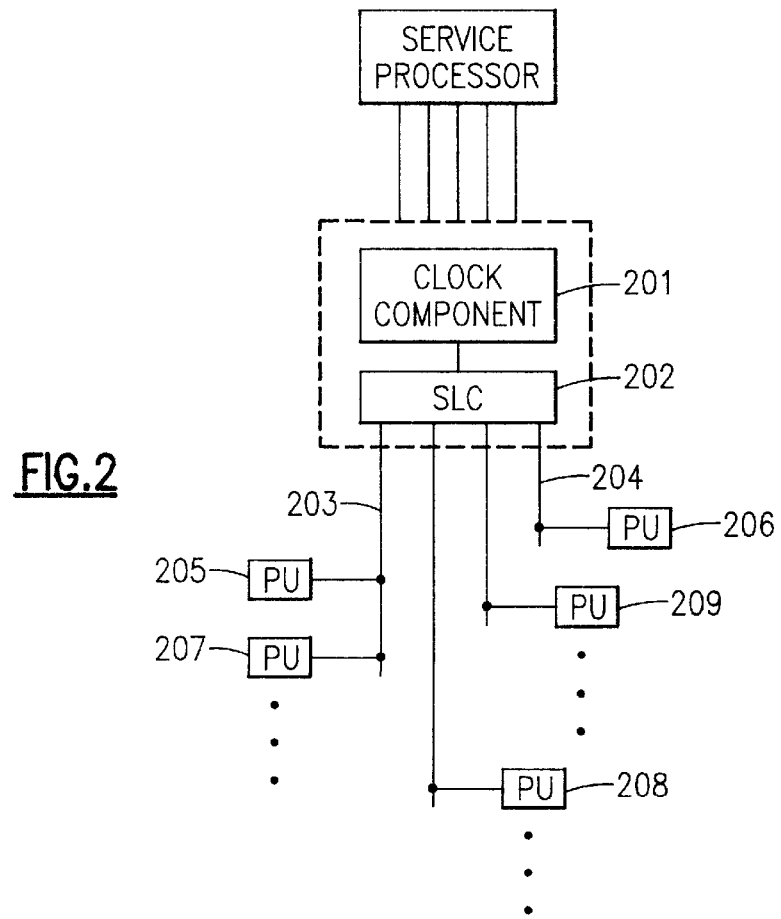
Figure 3:
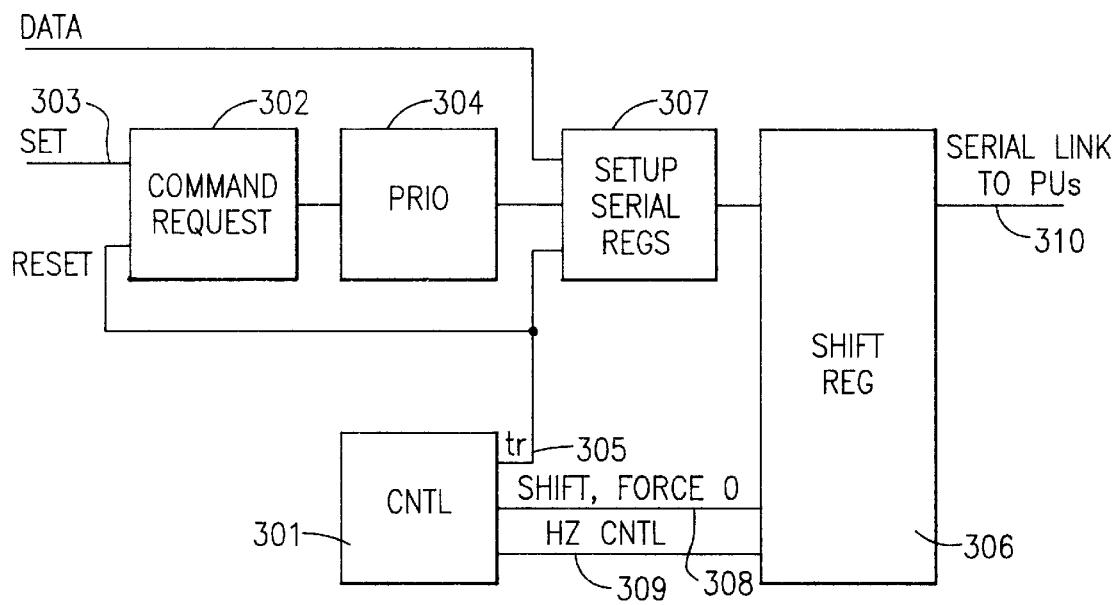
Figure 4:
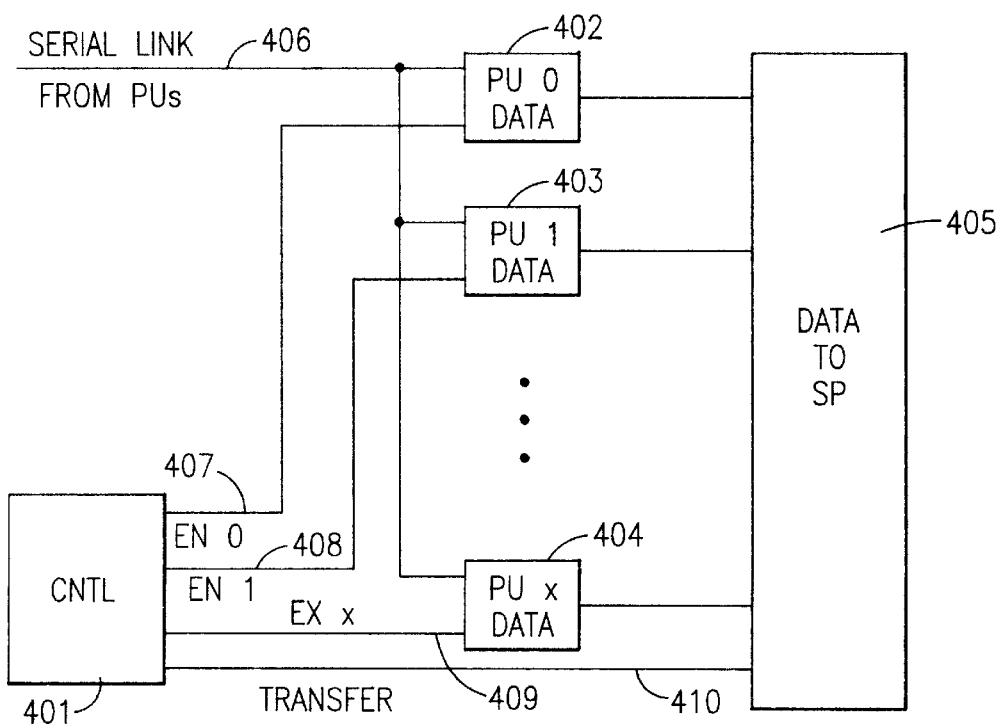
Figure 5:
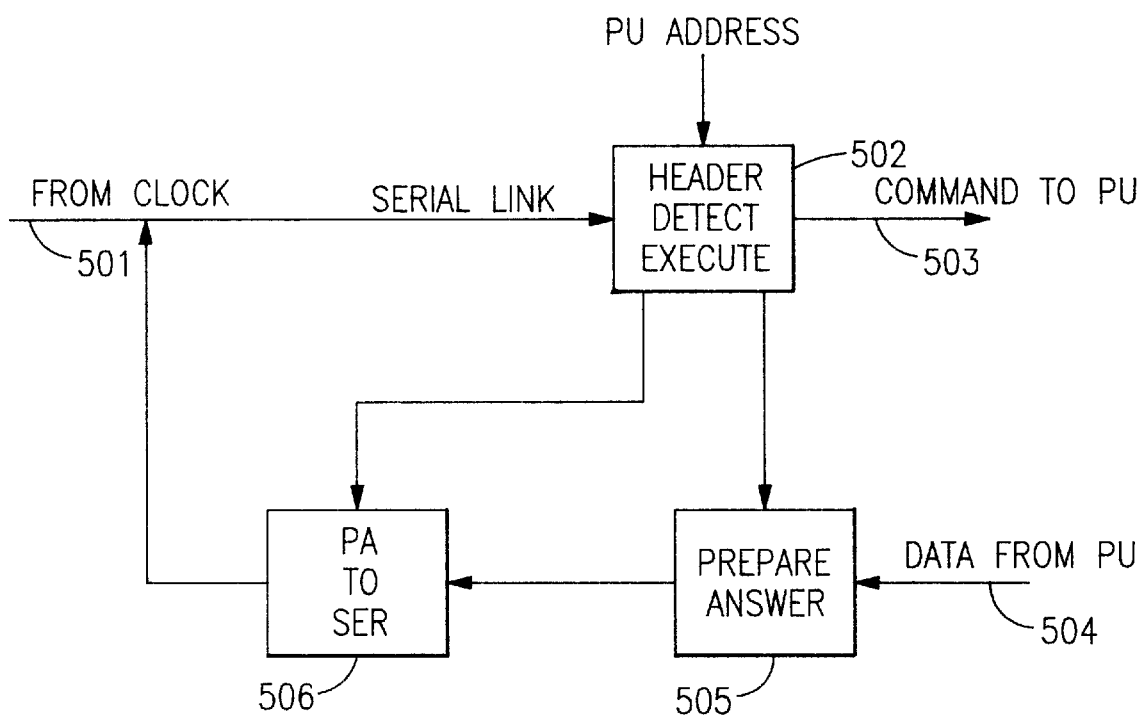

FIG. 1 is a diagram visualizing the single line linkage between the clock and the PU components FIG. 2 reflects the serial link combination circuitry FIG. 3 is a block diagram of the Master Send Logic located on the clock component FIG. 4 is a block diagram of the Master Receive Logic located on the clock component FIG. 5 is a block diagram of the Slave Logic located on each PU component

| | |
|---|---|
| Table 1 | is a table presenting the individual fields, their length and required transmission cycles for the current data frame |
| Table 2 | depicts the bit encoding scheme of the commands currently supported in the clock/PU communication |
| Table 3 | depicts the bit encoding scheme of the possible responses sent by a PU to the clock component |

4 DESCRIPTION OF THE PREFERRED EMBODIMENT

4.1 Overview of the Preferred Embodiment

The overall picture is modelled in FIG. 1. FIG. 1 shows a SP 101 connected with the clock component 100 by the well-known five-line support bus 102 for asynchronous communication between both components. The single wire communication link 105 represents the new communication medium for bidirectional, synchronous framed data exchange between the clock and any number of PU components 103, 104, . . . .

Due to requirements originating external to the clock-PU communication problem area additional requirements and boundary conditions might result in the need to support and operate several of above serial single communication lines in parallel linking the clock component for instance with different clusters of PU components to allow for a maximum of flexibility in tolerating any number of these parallel single line links not enforcing any modifications to the new communication circuitry but to represent from an overall point of view a single logical serial link Examples of problem areas rising such a need are for instance driving considerations of the micro electronics, manufacturing limitations or product flexibilities enabling different processor models spanning a large range with respect to the number of PU components. This type of task is solved by a serial link combination circuit which is part of the clock component. The outbound signals of the clock component are just transmitted by the serial link combination circuit on each of the parallel serial links. The inbound signals addressed to the clock component are combined and accumulated by the serial link combination circuit to generated a single signal to be transmitted to the actual clock. With respect to the inbound traffic the serial link combination circuit behaves like an OR gate. FIG. 2 depicts the serial link combination circuit 202 as part of the clock component 201. Any number of serial links 203 to 204 now can be operated in parallel where each of this serial links is able to serve a flexible number of PU components, for instance the PUs 205 to 209. In one specific implementation a MCM module bearing 6 PUs has been, because of driving restrictions and MCM test procedures, equipped with 3 serial link (one serial link for one pair of PUs).

4.2 The Communication Circuitry

The following list references all conditions which are signaled via the new serial interface. The commands are subset of all commands which also are exchanged between the SP and the clock component. The conditions are classified according the direction of the signaling, i.e. whether the signal is originating at the clock and targeted to the PU components or vice versa.

clock to PU
  Active PUs
    Allows to inform all PUs about the sub-set of active PUs and on the other hand allows to determine the PUs currently active.
  Malfunction Alert
    This command indicates a PU entering the check-stop state or loosing power.
  Micro Instruction Step
    Allows for the execution of a single micro instruction by realizing a breakpoint after a single micro instruction.
  Micro Address Compare
    Allows for a breakpoint in the micro instruction stream after the next address compare operation.
  Start Pulse
    Starts the clock component operation and moves the PU into the Micro Instruction Step modus.

PU to clock
  Soft Stop State
    The Soft Stopped State represents a certain state of a PU component characterized by stopped PU but running clock component. Possible causes are a Micro Instruction Step operation or a Micro Instruction Address Compare operation.
  Wait State
    Transfers a PU in a waiting state; i.e. no instruction is processed by the PU but interruptions may take place.
  Stopped State System Measurement Interface (SMI)
    Similar to the Soft Stop State used for the SMI operation.
  Trace Recording Stopped
    Allows during a trace recording to signal that specific trace buffers are made available by the PU.

The clock component is the master for driving the whole communication complex executing a specialized protocol. The protocol consists in transmitting information as blocks of data with a well-defined structure, called data frames. One central information component within the data frame, among others, is one or more requests or commands to be processed on one or more PU component.

The start of a data frame is identified by a unique data pattern, called a header, guaranteed by said communication circuitry to be unique and not to occur within said data frame. The uniqueness of the data header is achieved by a so-called return-to-zero (RZ) encoding scheme of the data within the data frame. RZ encoding, offered by the communication circuitry, consists in sending after each data bit a binary zero thus avoiding a bit pattern of two or more consecutive binary ones. Thus each binary data element takes two cycles to transmit. As a consequence of the RZ encoding scheme a bit pattern with at least 2 consecuting binary ones may serve as part of said data header. According to this reflections the current invention chooses the following 3-bit pattern 110 as the identifying header structure. The communication circuitry is operated in a synchronous mode. Which means that the clock component sends the data frames, i.e. the communication packages, on all interface signal lines (representing a single logical signal line as described above) at the same time. Each of the PU components receives and processes the same data frame. The response on all PU's is prepared within the same cycle after the header pattern detection. Thus the sum of all responses gives the complete system status for one distinct point of time. There is no timing diversity in the response. The individual PU components respond to the current data frame at certain time slots specific to each of said PU components during the current data frame transmission by sending a data block of predefined length to the clock component. The specific time frames dedicated to the individual PU components is defined by the PU numbers uniquely characterizing each individual PU. Once one data frame has been sent and the PUs responded to that data frame according their dedicated time slots the clock component starts transmitting the next data frame identified ba a new frame header. According the description above the header data pattern is the single case where two consecutive 1's are sent. Thus this indication is used to inform all PUs about the beginning of a new frame. The header is the only source for synchronizing the clock and the PU components. All following bits within the data frame are strictly position dependent. Two consecutive-binary one's inside the rest of the data frame generate a check.

As delineated for instance in FIG. 1 the clock component offers an external and asynchronous interface to the SP allowing the SP to issue commands to be processed at least on one of the PU components and to return the processing results. The clock component maps the command requested by the SP into a data frame, transfers the data frame for processing to said PU components and returns the response of the PUs across said external interface. An interesting feature of the communication circuitry is its capability to buffer several of said commands and to serialize the buffered commands for execution according a predefined priority scheme.

4.2.1 The Master Send Logic of the Communication Circuitry

That part of the communication circuitry located on the clock component and responsible for sending information over the logical serial link is called, as the clock is the master for driving the communication, Master Send Logic. The Master Send Logic is visualized in FIG. 3.

Referring to FIG. 3 the controller "Cntl" 301 is the master controller of the entire interface. It generates all the control signals required for operation of the interface.

The "command request" 302 latches are set via the "Set" interface 303 by external events, e.g. Write mode register or malfunction alert request. These latches may contain more than one request at a time. The priority-decoder "Prio" 304 selects that request with the highest priority. The output of this stage is one single request. Upon a transfer signal "Tr"

305 from the controller 301 this request and its associated data is loaded into the shift registers 306. Another part of the logic on the clock component provides all required data for the individual command.

"Setup serial Regs" 307 selects the correct data for the command and calculates the checksum (for more details on the checksum processing see below). At the same time the command just transferred into the shift register 306 is reset in the "Command request" 302 latches and the priority decoder "Prio" 304 will provide the request with the next-highest priority.

The master controller "Cntl" 301 also generates the header pattern and the 0's for the RZ datastream and the first bit of the response field (refer to the description below). It also controls the shift pulses 308 of the shift register as well as the high impedance control (HZ) 309 of the driver itself to allow a correct arbitration of this single signal.

Finally the data frame is transmitted on the logical serial link 310 to all PU components, which will receive and process the data frame concurrently.

4.2.2 The Master Receive Logic of the Communication Circuitry

That part of the communication circuitry located on the clock component and responsible for receiving information from the logical serial link is called, as the clock is the master for driving the communication, Master Receive Logic. The Master Receive Logic is visualized in FIG. 4.

Referring to FIG. 4 in the receiving mode the circuitry consists of the controller "Cntl" 401, a bank of data registers "PU 0 data . . . PU x data" 402 to 404 for the individual data of each PU and registers that can be sensed via the interface 405 by the SP (Service Processor). All individual PU data registers get the information from the serial logical link 406. The controller 401 selects the correct set by means of the enable lines "En 0 . . . Enx" 407 to 409.

When the last PU has sent its data via this interface, the controller issues a transfer signal "Transfer" 410 that transfers the data into latches 402 to 404 that the SP may sense. Waiting for the last PU ensures that there is no time difference in the data presented to the SP, the data is sampled at the same time in all PUs regardless of the individual response frame of a single PU.

Checking for a correct RZ (return to zero) signal is also done during receive mode under the control of the master controller 301.

The Master Receiver Logic on the clock component has an integrated pull down, thus any unplugged or check-stopped PU component will send only 0's.

4.2.3 The Slave Logic of the Communication Circuitry

That part of the communication circuitry located on each PU component and responsible for sending and receiving information over the logical serial link is called, as the clock is the master for driving the communication, Slave Logic. The Slave Logic is visualized in FIG. 5.

Referring to FIG. 5 the slave logic is implemented on each PU component. The serial input data stream 501 is analyzed by the "Header detect/Execute" logic 502. This logic waits for the header pattern. Once this logic recognizes the header pattern, its converting the serial data stream from the interface 501 into parallel signals 503 and validating the checksum (for more information on the checksum see below).

The resulting command executes and the response data 504 is prepared by the "Prepare resp" 505 stage.

The response on all PUs is prepared within the same cycle after the header pattern detection. Thus the sum of all responses gives the complete system status for one distinct point of time. There is no timing diversity in the response.

The actual time frame for shifting out the data depends on the unique PU address, represented by the unique PU number, to avoid driving conflicts on the interface.

The "Header detect/Execute" logic 502 acts as a controller for the single PU. It synchronizes to the incoming data stream and then controls the parallel to serial conversion "Par to Ser" 506 for shifting out the data and enabling of the driver for the interface.

Checking for an invalid header (insufficient number of cycles since the last header) or invalid RZ signal is also accomplished by "Header detect/Execute" logic 502.

4.3 The Protocol and the Processing Behavior of the Communication Partners

Before preceding with a discussion on the micro structure and the detailed layout of the a data frame transmitted via the serial link, it should be mentioned that a certain layout and especially the length of a data frame layout is dependent on a maximum number of PU components to be supported. On the other hand it is be stressed that the invention is easily adaptable to support any number of PU components.

Currently the data frame consists of the following fields:
1. Header
a unique bit pattern for synchronization of all communicating components and identification of the beginning of a new data frame
2. PU Field
a field to select and identify one or more PU components by a PU number uniquely identifying exactly one PU within said processor system
3. CMD Field
the CMD Field encodes a command field selecting one or more commands of a set of possible commands for execution on one or more of the PU components while the PU selection process may depend on the contents of the PU Field
4. Checksum
a field encoding checking information permitting a receiver to execute transmission error detection and error correction
5. Response Field PU0
a response field to be filled by the reacting PU component PU0
6. Response Field PU1
a response field to be filled by the reacting PU component PU1
7. . . .

The length of each field assembling the data frame and the required number of transmission cycles is reflected in Table 1.

Currently one complete frame consists of 339 cycles. This complete frame is initiated and transmitted every 512 cycles by the clock component. After completing the transmission of one data frame, i.e. after 339 cycles, the clock enters a dead time sending binary zeros (0) only.

The clock component offers a default command processing behavior. If no specific command is to be executed, for instance issued by the SP, a specific default command request is written to the CMD Field of the data frame and requested for execution by the PUs. This default command is the "Active PUs" command (for more details of this specific command see the discussion of the individual commands below). From previous responses, i.e. the sense bits, of all PUs the clock component generated a precise representation of the currently active PU components within the system which is propagated by "Active PUs" command to all PUs to inform each individual PU on the current overall system status.

The default command processing is interrupted if one of the following conditions is recognized:
Chip Check from any PU
Write Mode register
Start Pulse

4.3.1 The Individual Data Fields

4.3.1.1 Header

The structure and purpose of the Header has been already discussed above extensively.

4.3.1.2 PU Field

The PU Field is used to select and identify one or more PU components by a PU number uniquely identifying exactly one PU within said processor system. In the current implementation the PU Field covers 16 bits. The implementation exploits an encoding scheme where each bit position in the PU Field represents and selects a specific PU. It is important to realize that depending on which of the bit positions are switched to a binary 1 this encoding scheme allows to select any subset of PUs within the processor system. To be able select not just a single PU but a set of PUs has been the background for using above encoding scheme. As the current implementation uses a 16 bit PU Field it thus supports to model up to 16 PUs. The current length of the implementation represents no limitation as the length of the PU Field may be enhanced to model an required number of PUs. Depending on the succeeding CMD Field the contents of the PU Field may interpreted differently.

4.3.1.3 CMD Field

The CMD Field encodes a command field selecting one or more commands of a set of possible commands. The type of command to be encoded in the CMD Field is a special purpose command only of importance for the clock and PU cooperation. It has to be carefully distinguished from a genuine PU command. Also both types of the command are executed in different parts of the PU component concurrently. In the present implementation the CMD Field is 16 Bit in length. By again exploiting an encoding scheme where each bit position in the CMD Field represents a certain command it is possible not just to select a single but a set of commands for processing by the PUs. Based on the length of the CMD Field, a set of 16 different commands can be defined for selection. Should a set of 16 different commands be too small by increasing the length of the CMD Field any number of different commands could be supported. The same data frame and thus the same CMD Field is transmitted to all PUs for execution; i.e. all PUs are receiving and in general are processing the same command synchronously. Depending on the contents of the PU Field and the type of command only certain PUs will process the command. There are commands that execute on all PUs regardless of the PU field and commands that execute only on specific PUs depending on the PU field.

Preceding the command execution all PUs verify the Checksum field (see discussion below). The command encoded within the CMD Field must not be executed if the checksum has not been successfully verified.

An overview of the current bit encoding scheme of the individual commands is listed in Table 2.

4.3.1.3.1 Discussion of the Supported Commands

4.3.1.3.1.1 Malfunction Alert

The Malfunction Alert command is valid for all PUs, i.e. is processed by all PUs. The corresponding bits in the PU Field is set for all failing PUs.

As execution result of this command all PUs specified in the PU Field set their malfunction alert registers. Malfunction Alert command changes the active PUs. Thus a high priority "Active PUs" (see discussion below) command is performed immediately after the "Malfunction Alert" command.

4.3.1.3.1.2 Active PUs

The Active PUs command is valid for all PUs, i.e. is processed by all PUs.

As execution result of this command all PUs set their internal Active PUs Register according to the content of the PU Field. The clock component set the PU Field to a value specifying the set of currently active PUs; the bit positions of the active PUs were set to the logical value '1'.

4.3.1.3.1.3 Micro Instruction Set ON

The Micro Instruction Set ON command is valid only for PUs addressed in the PU Field, i.e. only those PUs will process that command.

As execution result of this command those PUs specified by the PU Field will raise internal latch "Micro Instruction Step" immediately. The condition "Effective Micro Instruction Step" is turned on as well.

4.3.1.3.1.4 Micro Instruction Step OFF

The Micro Instruction Step OFF command is valid only for PUs addressed in the PU Field, i.e. only those PUs will process that command.

As execution result of this command those PUs specified by the PU Field will turn off internal latch "Micro Instruction Step". In addition the condition "Effective Micro Instruction Step" is turned off at the next Start Pulse command execution.

4.3.1.3.1.5 Micro Address Compare ON

The Micro Address Compare ON command is valid only for PUs addressed in the PU field, i.e. only those PUs will process that command.

As execution result of this command those PUs specified by the PU Field will raise the internal latch "Micro Address Compare" immediately. The condition "Effective Micro Address Compare" is turned on as well.

4.3.1.3.1.6 Micro Address Compare OFF

The Micro Address Compare Off command is valid only for PUs addressed in the PU field, i.e. only those PUs will process that command.

As execution result of this command those PUs specified by the PU Field will turn off the internal latch "Micro Address Compare". In addition the condition "Effective Micro Address Compare" is turned off upon execution of the next Start Pulse command.

4.3.1.3.1.7 Start Pulse

The Start Pulse command is valid only for PUs addressed in the PU field, i.e. only those PUs will process that command.

As execution result the "Start Pulse" command issues either a low pulse on "Effective Micro Instruction Step/Effective Micro Address Compare" or sets these signals to low. If the "Micro Instruction Step/Micro Address Compare" latches are set, the effective signals drop for a single cycle, otherwise the effective signals drop until being set again by a new command.

4.3.1.3.2 Command Priority and Default Command Processing

The communication circuitry supports that several command may be requested at the same time for execution of the clock component. Each command is related to an execution priority which is of importance if several commands are queued and serialized for execution. These commands are serialized in the clock component according to the following decreasing priority order:

1. Malfunction Alert
2. Active PU's
3. Micro Instruction Step ON
4. Micro Instruction Step OFF
5. Micro Address Compare ON 6. Micro Address Compare OFF 7. Start Pulse The clock component offers a default command processing behavior. If no specific request of the above commands is pending, for instance issued by the SP, a specific default command request is written to the CMD Field of the data frame and requested for execution by the PUs. This default command is the "Active PUs" command. From previous responses, i.e. the sense bits, of all PUs the clock component generated a precise representation of the currently active PU components within the system which is propagated by "Active PUs" command to all PUs to inform each individual PU on the current overall system status.

Malfunction Alert command changes the active PUs. Thus a high priority "Active PUs" command is performed immediately after the "Malfunction Alert" command.

4.3.1.4 Checksum

The Checksum field encodes checking information permitting a receiver to execute transmission error detection and error correction. The Checksum filed is thus the basis to enable error detection and correction at all. As redundancy information the Checksum field stores the number of 1 bits contained in the PU and CMD Fields. It is calculated by the clock component and must be recomputed by the PUs and compared to the transmitted Checksum value. The PUs should execute the requested command if and only if the Checksum has been validated successfully.

4.3.1.5 Response Fields

For each PU component within the processor system one dedicated Response Field is provided in the data frame. The Response Field is associated to each unique PU component by the time slot that specific PU is permitted to transmit its response. This association is done on the basis of the PU number uniquely characterizing each individual PU component.

Currently the implementation supports up to 16 PU components requiring the same number of Response Fields in the data frame. A Response Field is 8 bits in length. The spectrum of possible responses from a PU to the clock component is listed in Table 3. Again an encoding scheme has been exploited were each bit position in the Response Field is related to a certain elementary response. This approach allows to transmit a set of different responses simultaneously within one Response Field. The implemented approach easily allows to increase the number of supported PUs (by introduction of additional Response Fields) or to enlarge the spectrum of possible PU responses (by expanding the individual Response Field width) by augmenting the data frame.

The time slot for sending a PU response and therefore the Response Field reservation takes place independent of the PU Field and the CMD Field sent by the clock component. Even if the a certain PU does not process a certain CMD Field that Response Field is made available to the PU component and each PU component that has validated the checksum must return the "Command Accepted" bit turned on in the Responses Field regardless whether the command affects the PU or not.

The serial link combination circuit (refer to FIG. 2) realizes a single logical serial link by 'OR'ing all signal lines internally in the clock component, thus the response received by the clock component does only depend on detection mechanism in the clock and PU components and not on the actual signal wiring between the clock component and the PUs. No response interference is possible on the serial link as only one and only one PU is responding at each time slot. But to protect the overall system against any type of error situations like a PU generated check condition not related to this interface or other reasons resulting in a remaining '1' on the PU-to-clock link a specific line clearance signaling concept has been introduced. Stabilization against error situations on the serial communication link by the line clearance approach means that the clock component sends a '0' on all the parallel serial communication interface lines, representing the first bit of the each Response Field, prior to each response of an individual PU. This ensures correct operation in the case that, as all signal lines are 'OR'ed internally in the clock component, one signal line stuck at '1' would block the entire interface until the clock component sends the next command. Sending a '0' by the clock component on all interface lines clears the interface again.

4.3.2 Error Handling

Compared to the state of the art which teaches a mere one-directional signal transfer in the domain of the current invention two most important features of the invention open a new dimension in error handling:

By introducing a bidirectional communication protocol between the clock and the PU components instead of the mentioned one-directional signal propagation approach taught by the state of the art it becomes possible the first time that the clock and PU establish a feedback loop informing one another on communication and signaling errors.

By introducing redundancy information within the transmitted data in form of a Checksum Field the communication partners are facilitated to establish error detection and error correction procedures.

As a result the overall system can be stabilized significantly against error situations.

In the current implementation the following classes of errors are handled by the communication circuitry on the clock and the PU components:

Invalid Start Condition

As discussed above the communication circuitry guarantees that the unique Header of a data frame will not occur as part of the frame data. If in conflict with this principle a PU that has already detected a Header pattern and then detects another Header pattern before it has been able to respond to the first data frame signaled by the first Header generates a check (signaled along a separate "Any Check" wire for time critical check conditions).

Checksum Error

If the transmitted Checksum being part of the data frame does not match with the recalculated Checksum calculated based on the transmitted PU and CMD Fields a transmission error has occurred. Any PU detecting this condition generates a check.

No RZ (Return to Zero) Signal

This condition is the most general error condition detected by the communication partners. It is raised if there is a binary '1' on the signal line when definitely according the RZ encoding scheme a binary '0' is to be expected. This condition can be detected by the clock component and by the PUs.

The current implementation concentrates on error detection but extensions including error correction easily could be realized by additional logic on the communication components.

4.4 Impact on Service Processor (SP) Command Processing

The different implementation compared to former designs has an impact on the interface between the SP and the to clock (refer to FIG. 1 for instance). On the one hand side a write operation to the Mode Register which was immediately valid now takes several cycles to be effective. On the other hand side it takes several cycles to signal the "Softstop State" to the service processor.

4.4.1 Write Mode Register

The Write Mode Register is a specific register located on the clock component for switching the Micro Instruction Step processing on/off. The clock component splits the "Write Mode Register" command from the SP into a sequence of 4 PU-clock Interface commands with the according PU fields:

1. Micro Instruction Step ON
2. Micro Instruction Step OFF
3. Micro Address Compare ON
4. Micro Address Compare OFF The clock component turns on the request bits for this 4 actions in an internal register, visualized as "command request" 302 in FIG. 3. If there is no pending request with higher priority these 4 commands execute in the next 4 frames.

The pending "Write Mode Register" command is indicated in the Status Sense bit 32, being part of a specific status register on the clock component. This sense bit prevents the SP from issuing the next command while the current has not been accepted completely by the clock component.

4.4.2 Start Pulse

The "Start Pulse" sets the corresponding bit in the Interface command register. The command actually executes if there is no request with higher priority pending.

The pending "Start Pulse" command is indicated in the Status Sense bit 33, being part of a specific status register on the clock component. This sense bit prevents the SP from issuing the next command while the current has not been accepted completely by the clock component.

4.4.3 Debugging Features

A special debugging feature is implemented in the clock component. The Service Processor (SP) may setup certain shadow registers within the clock component for storing specific values for the PU, CMD and CHECKSUM Fields in the data frame. A special command from the SP will insert these commands into the data stream, i.e. into the corresponding fields of the data frame. As a consequence the shadow register approach offers a sidetrack for setting up the individual fields in the data frame explicitly circumventing for instance the automatic checksum calculation etc.. An exploitation of this feature allows emulation of some advanced features of this interface (e.g. "command merging" or error injection) that are currently not generated automatically by the hardware.

Command merging means that multiple commands are sent to a specific PU within one cycle (e.g. Turn on Micro Instruction Step and turn on Micro Address Compare within a single command).

Error injection can be performed by the SP by writing a invalid checksum into the shadow register. In creating intentional invalid checksums which have to be recognized by the error recognition circuits on the clock and PU components one is able to verify the checking circuitry itself resolving the well-known problem of "checking the checker".

5 Acronyms

HZ High Impedance
IML Initial Microprogram Load
MCM Multi-Chip-Module
PU Processing Unit
RZ Return-to-Zero-Encoding
SMI System Measurement Interface
SP Service Processor

TABLE 1

Layout of a Data Frame

| Field Length in Bits | Transmiss1 on Cycles | Content |
| --- | --- | --- |
| — | 3 | Header Field |
| 16 | 32 | PU Field |
| 16 | 32 | CMD Field |
| 8 | 16 | Checksum Field |
| 8 | 16 | Response Field PU0 |
| 8 | 16 | Response Field PU1 |
| 8 | 16 | Response Field PU2 |
| 8 | 16 | Response Field PU3 |
| 8 | 16 | Response Field PU4 |
| 8 | 16 | Response Field PU5 |
| 8 | 16 | Response Field PU6 |
| 8 | 16 | Response Field PU7 |
| 8 | 16 | Response Field PU8 |
| 8 | 16 | Response Field PU9 |
| 8 | 16 | Response Field PU10 |
| 8 | 16 | Response Field PU11 |
| 8 | 16 | Response Field PU12 |
| 8 | 16 | Response Field PU13 |
| 6 | 16 | Response Field PU14 |
| 8 | 16 | Response Field PU15 |
| — | 339 | Total Cycles |

TABLE 2

Command Encoding within CMD Field

| Bit Position | CMD Field |
| --- | --- |
| 0 | Malfunction Alert |
| 1 | Active PUs |
| 2 | Micro Instruction Step ON |
| 3 | Micro Instruction Step OFF |
| 4 | Micro Address Compare ON |
| 5 | Micro Address Compare OFF |
| 6 | Start Pulse |
| 7 | reserved |
| 8 | reserved |
| 9 | reserved |
| 10 | reserved |
| 11 | reserved |
| 12 | reserved |
| 13 | reserved |
| 14 | reserved |
| 15 | reserved |

TABLE 3

Responses within Response Field

| Bit Position | Response |
| --- | --- |
| 0 | Force '0' by clock |
| 1 | Force '0' by sending PU |
| 2 | command accepted |
| 3 | Soft Stop State |
| 4 | Wait State |
| 5 | Stopped State SMI |
| 6 | Trace Buffer Stopped |
| 7 | reserved |

We claim:

1. A processor system comprising:
   a) one or more processing units, each comprising processing unit communication circuitry, and
   b) a clock component connected to each of said one or more processing units by a serial link, said clock component comprising a clock, and further comprising clock component communication circuitry performing bi-directional serial communication over said serial link between said clock component and each of said one or more processing units.

2. The processor system of claim 1 in which said clock component communication circuitry comprises master send logic sending information to one or more of the processing units over said serial link, and master receive logic receiving information from one or more of the processing units.

3. The processor system of claim 2 in which said processing unit communication circuitry comprises slave logic sending and receiving information over said serial link.

4. The processor system of claim 1 in which the clock component further comprises a serial link combination circuit connected to the clock by a single serial link, and connected to the processing units by two or more serial links.

5. The processor system of claim 1 in which said clock component further comprises an external interface connected to a command-issuing service processor.

6. The processor system of claim 3 in which said clock component communication circuitry comprises clock component means for performing error detection and correction in cooperation with said processing unit communication circuitry, and in which said processing unit communication circuitry comprises processing unit means for performing error detection and correction in cooperation with said clock component communication circuitry.

7. A processor system comprising:
   a) One or more processing units, each comprising processing unit communication circuitry means for communicating with a clock component; and
   b) said clock component, connected to each of said one or more processing units by a serial link, said clock component comprising a clock, and further comprising clock component circuitry means for performing bi-directional serial communication over said serial link between said clock component and each of said one or more processing units.

8. The processor system of claim 7 in which said clock component communication circuitry means comprises master send logic means for sending information to one or more of the processing units over said serial link, and master receive logic means for receiving information from one or more of the processing units.

9. The processor system of claim 8 in which said processing unit communication circuitry comprises slave logic means for sending and receiving information over said serial link.

10. The processor system of claim 7 in which said clock component further comprises a serial link combination circuit means connected to the clock by a single serial link, and connected to the processing units by two or more serial links.

11. The processor system of claim 7 in which said clock component further comprises an external interface means for connecting to a command-issuing service processor.

* * * * *